US012406787B2

(12) United States Patent
Yoshidome et al.

(10) Patent No.: US 12,406,787 B2
(45) Date of Patent: Sep. 2, 2025

(54) SOFT MAGNETIC ALLOY POWDER, DUST CORE, MAGNETIC COMPONENT, AND ELECTRONIC DEVICE

(71) Applicant: TDK CORPORATION, Tokyo (JP)

(72) Inventors: Kazuhiro Yoshidome, Tokyo (JP); Hiroyuki Matsumoto, Tokyo (JP); Kenji Horino, Tokyo (JP); Masakazu Hosono, Tokyo (JP); Yoshiki Kajiura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 359 days.

(21) Appl. No.: 16/665,000

(22) Filed: Oct. 28, 2019

(65) Prior Publication Data

US 2020/0135369 A1    Apr. 30, 2020

(30) Foreign Application Priority Data

Oct. 31, 2018 (JP) ................................ 2018-205070

(51) Int. Cl.
*H01F 1/153* (2006.01)
*C22C 45/02* (2006.01)

(52) U.S. Cl.
CPC ......... *H01F 1/15325* (2013.01); *C22C 45/02* (2013.01); *H01F 1/15333* (2013.01)

(58) Field of Classification Search
CPC .... H01F 1/15325; H01F 1/15333; H01F 3/08; H01F 27/255; H01F 1/14733;
(Continued)

(56) References Cited

U.S. PATENT DOCUMENTS 5,871,593 A * 2/1999 Fish .................... H01F 1/15308 148/307
2004/0194856 A1* 10/2004 Miyoshi .................. B22F 9/008 148/105
(Continued)

FOREIGN PATENT DOCUMENTS

EP 0695812 A1 * 7/1995 ............. C22C 45/02
JP 62256411 A * 11/1987 ........... H01F 41/026
(Continued)

OTHER PUBLICATIONS

Takahara, Yoshihiro, and Nobutaka Narita. "Classification of Crystallization Process of Fe—B—Si Amorphous Alloys by Electrical Resistivity and Calorimetric Measurements." Materials Transactions, JIM, vol. 41, No. 8, 2000, pp. 1077-1081. (Year: 2000).*
(Continued)

*Primary Examiner* — John A Hevey
(74) *Attorney, Agent, or Firm* — Oliff PLC

(57) ABSTRACT

A soft magnetic alloy powder includes a main component of $(Fe_{(1-(\alpha+\beta))}X1_{\alpha}X2_{\beta})_{(1-(a+b+c+d+e+f))}M_aB_bP_cSi_dC_eS_f$, in which X1 is one or more of Co and Ni, X2 is one or more of Al, Mn, Ag, Zn, Sn, As, Sb, Cu, Cr, Bi, N, O, and rare earth elements, and M is one or more of Nb, Hf, Zr, Ta, Mo, W, Ti, and V. $0\leq a\leq 0.160$, $0.020\leq b\leq 0.200$, $0\leq c\leq 0.150$, $0\leq d\leq 0.060$, $0\leq e\leq 0.030$, $0.0010\leq f\leq 0.030$, $0.005\leq f/b\leq 1.50$, $\alpha\geq 0$, $\beta\geq 0$, and $0\geq\alpha+\beta\geq 0.50$ are satisfied.

7 Claims, 5 Drawing Sheets

(58) Field of Classification Search
CPC ....... C22C 45/02; C22C 38/00; C22C 38/002; C22C 38/02; C22C 38/12; C22C 38/005; C22C 38/008; C22C 38/06; C22C 38/08; C22C 38/10; C22C 38/14; C22C 38/16; C22C 38/26; C22C 2200/04; B22F 1/065; B22F 1/00
See application file for complete search history.

(56) References Cited

U.S. PATENT DOCUMENTS

| | | | | |
|---|---|---|---|---|
| 2011/0085931 | A1* | 4/2011 | Ohta | C21D 8/1272 420/89 |
| 2011/0108167 | A1* | 5/2011 | Ohta | C22C 38/16 148/660 |
| 2012/0199254 | A1* | 8/2012 | Urata | C22C 33/003 148/579 |
| 2012/0318412 | A1 | 12/2012 | Ohta et al. | |
| 2016/0027566 | A1* | 1/2016 | Ohta | C21D 1/18 148/112 |
| 2018/0122543 | A1* | 5/2018 | Harada | C22C 38/42 |
| 2018/0218810 | A1 | 8/2018 | Harada et al. | |
| 2019/0156975 | A1 | 5/2019 | Urata et al. | |

FOREIGN PATENT DOCUMENTS

| | | | | | |
|---|---|---|---|---|---|
| JP | H02232301 | A | * | 9/1990 | |
| JP | 08064408 | A | * | 3/1996 | H01F 1/047 |
| JP | 2009252873 | A | * | 10/2009 | |
| JP | 2011023673 | A | * | 2/2011 | H01F 41/000 |
| JP | 2016-025352 | A | | 2/2016 | |
| JP | 2017-107935 | A | | 6/2017 | |
| JP | 2018073947 | A | * | 5/2018 | |
| KR | 10-2018-0089308 | A | | 8/2018 | |
| KR | 10-2018-0107282 | A | | 10/2018 | |
| WO | 2011/122589 | A1 | | 10/2011 | |

OTHER PUBLICATIONS

Machine Translation of JP-2011023673-A (Year: 2011).*
Machine Translation of JP-62256411-A (Year: 1987).*
Machine Translation of JP-08064408-A (Year: 1996).*
Machine Translation of JP-2018073947-A (Year: 2018).*
Machine Translation of JP-2009252873-A (Year: 2009).*
Machine Translation of JPH02232301A (Year: 1990).*

* cited by examiner

SOFT MAGNETIC ALLOY POWDER, DUST CORE, MAGNETIC COMPONENT, AND ELECTRONIC DEVICE

BACKGROUND OF THE INVENTION

The present invention relates to a soft magnetic alloy powder, a dust core, a magnetic component, and an electronic device.

In recent years, low power consumption and high efficiency are demanded in electronic, information, communication equipment, etc. (particularly, in electronic equipment). Moreover, this demand is getting stronger for low carbon society. Thus, the reduction of energy loss and the improvement of power supply efficiency are also demanded in electronic, information, communication equipment, etc. (particularly, in power supply circuit of electronic equipment).

For the reduction of energy loss and the improvement of power supply efficiency, it is demanded to obtain a soft magnetic alloy powder having excellent soft magnetic characteristics and being capable of improving the filling rate when used for dust cores.

Patent Document 1 discloses a soft magnetic metal powder having an improved Wardel's sphericity. Patent Document 1 also discloses that an excellent power inductor can be manufactured by improving the sphericity.

Patent Document 1: JP2016025352 (A)

BRIEF SUMMARY OF INVENTION

However, Patent Document 1 only discloses that sphericity is improved in an extremely limited composition. It is demanded to improve the sphericity while soft magnetic characteristics are improved even in a composition differing from that of Patent Document 1.

Incidentally, the sphericity of the soft magnetic alloy powder may be evaluated by evaluating a circularity of a projected particle shape of the soft magnetic alloy powder.

It is an object of the invention to provide a soft magnetic alloy powder or so having a low coercivity and a high sphericity.

To achieve the above object, a soft magnetic alloy powder of the present invention includes a main component of $(Fe_{(1-(\alpha+\beta))}X1_{\alpha}X2_{\beta})_{(1-(a+b+c+d+e+f))}M_aB_bP_cSi_dC_eS_f$, in which X1 is one or more of Co and Ni, X2 is one or more of Al, Mn, Ag, Zn, Sn, As, Sb, Cu, Cr, Bi, N, O, and rare earth elements, and M is one or more of Nb, Hf, Zr, Ta, Mo, W, Ti, and V, wherein $0 \le a \le 0.160$, $0.020 \le b \le 0.200$, $0 \le c \le 0.150$, $0 \le d \le 0.060$, $0 \le e \le 0.030$, $0.0010 \le f \le 0.030$, $0.005 \le f/b \le 1.50$, $\alpha \ge 0$, $\beta \ge 0$, and $0 \le \alpha+\beta \le 0.50$ are satisfied.

In the above-mentioned structure, the soft magnetic alloy powder of the present invention can reduce coercivity and improve sphericity.

Preferably, an average circularity of the soft magnetic alloy powder is 0.90 or more.

Preferably, an average circularity of the soft magnetic alloy powder is 0.95 or more.

The soft magnetic alloy powder may contain nanocrystals.

Preferably, the nanocrystals have a crystallinity of 25% or more.

Preferably, a compound phase other than a bcc phase in the nanocrystals has a crystallinity of 5% or less.

Preferably, $0.005 \le f/b \le 0.500$ is satisfied.

Preferably, $0.735 \le 1-(a+b+c+d+e+f) \le 0.900$ is satisfied.

A dust core of the present invention includes the soft magnetic alloy powder.

A magnetic component of the present invention includes the soft magnetic alloy powder.

An electronic device of the present invention includes the soft magnetic alloy powder.

DETAILED DESCRIPTION OF INVENTION

Figure 1:
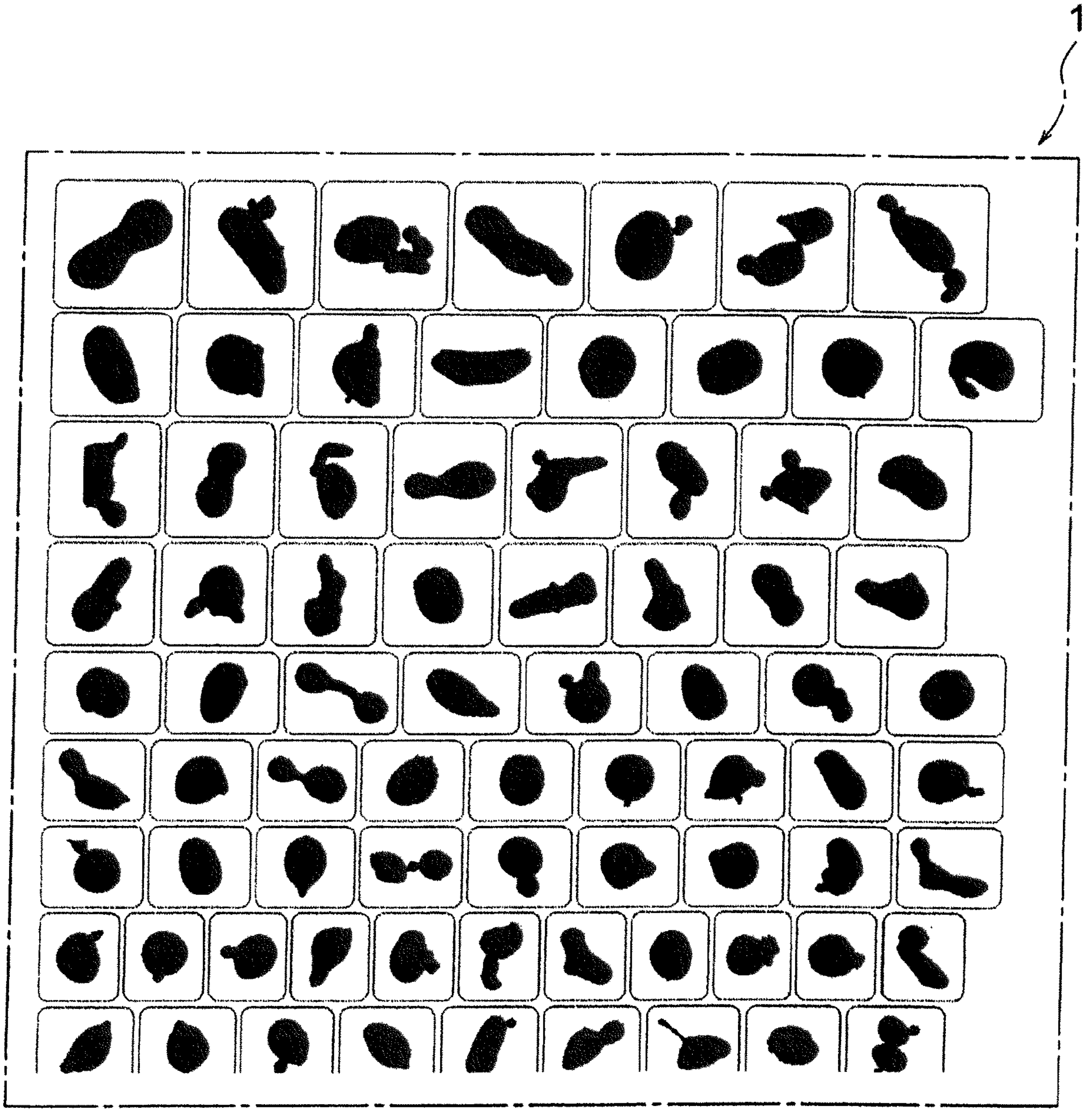
FIG. 1 is an observation result by Morphologi G3.

Hereinafter, an embodiment of the present invention is described.

A soft magnetic alloy powder according to the present embodiment includes a main component of $(Fe_{(1-(\alpha+\beta))}X1_{\alpha}X2_{\beta})_{(1-(a+b+c+d+e+f))}M_aB_bP_cSi_dC_eS_f$, in which X1 is one or more of Co and Ni, X2 is one or more of Al, Mn, Ag, Zn, Sn, As, Sb, Cu, Cr, Bi, N, O, and rare earth elements, and M is one or more of Nb, Hf, Zr, Ta, Mo, W, Ti, and V, wherein $0 \le a \le 0.160$, $0.020 \le b \le 0.200$, $0 \le c \le 0.150$, $0 \le d \le 0.060$, $0 \le e \le 0.030$, $0.0010 \le f \le 0.030$, $0.005 \le f/b \le 1.50$, $\alpha \ge 0$, $\beta \ge 0$, and $0 \le \alpha+\beta \le 0.50$ are satisfied.

The soft magnetic alloy powder according to the present embodiment has the above-mentioned composition and can thereby easily have a favorable particle shape. Specifically, the soft magnetic alloy powder according to the present embodiment has the above-mentioned composition and can thereby have a particle shape close to a sphere, that is, a high sphericity. In general, when a soft magnetic alloy powder has a particle shape close to a sphere, a dust core or so using this soft magnetic alloy powder having particle shape can have an improved filling rate and improved various characteristics, such as coercivity.

When the soft magnetic alloy powder according to the present embodiment is subjected to a heat treatment, nanocrystals having a crystal particle size of 50 nm or less are easily deposited. In particular, nanocrystals (hereinafter, also referred to as Fe based nanocrystals) whose Fe crystal structure is bcc (body-centered cubic lattice structure) are easily deposited. In other words, the soft magnetic alloy powder according to the present embodiment is easily used as a start raw material of a soft magnetic alloy powder where nanocrystals are deposited and is particularly easily used as a start raw material of a soft magnetic alloy powder where nanocrystals whose Fe crystal structure is bcc are deposited.

Hereinafter, explained is a method of confirming whether the soft magnetic alloy powder has an amorphous phase structure (a structure composed of only amorphous phase or a nanohetero structure) or a crystal phase structure. In the present embodiment, a soft magnetic alloy powder having an amorphization rate X (see the following formula (1)) of 85% or more is considered to have an amorphous phase structure, and a soft magnetic alloy powder having an amorphization rate X of less than 85% is considered to have a crystal phase structure.

$$X=100-(Ic/(Ic+Ia)\times100) \quad (1)$$

Ic: scattering integrated intensity of crystal phase

Ia: scattering integrated intensity of amorphous phase

The amorphization rate X is calculated based on the above-mentioned formula (1) by carrying out an X-ray crystal structure analysis of a soft magnetic alloy powder with XRD, identifying the phase, reading peaks of a crystalized Fe or compound (Ic: scattering integrated intensity of crystal phase, Ia: scattering integrated intensity of amorphous phase), and calculating a crystallization rate from the peak intensities. Hereinafter, the calculation method is more specifically explained.

Figure 4:
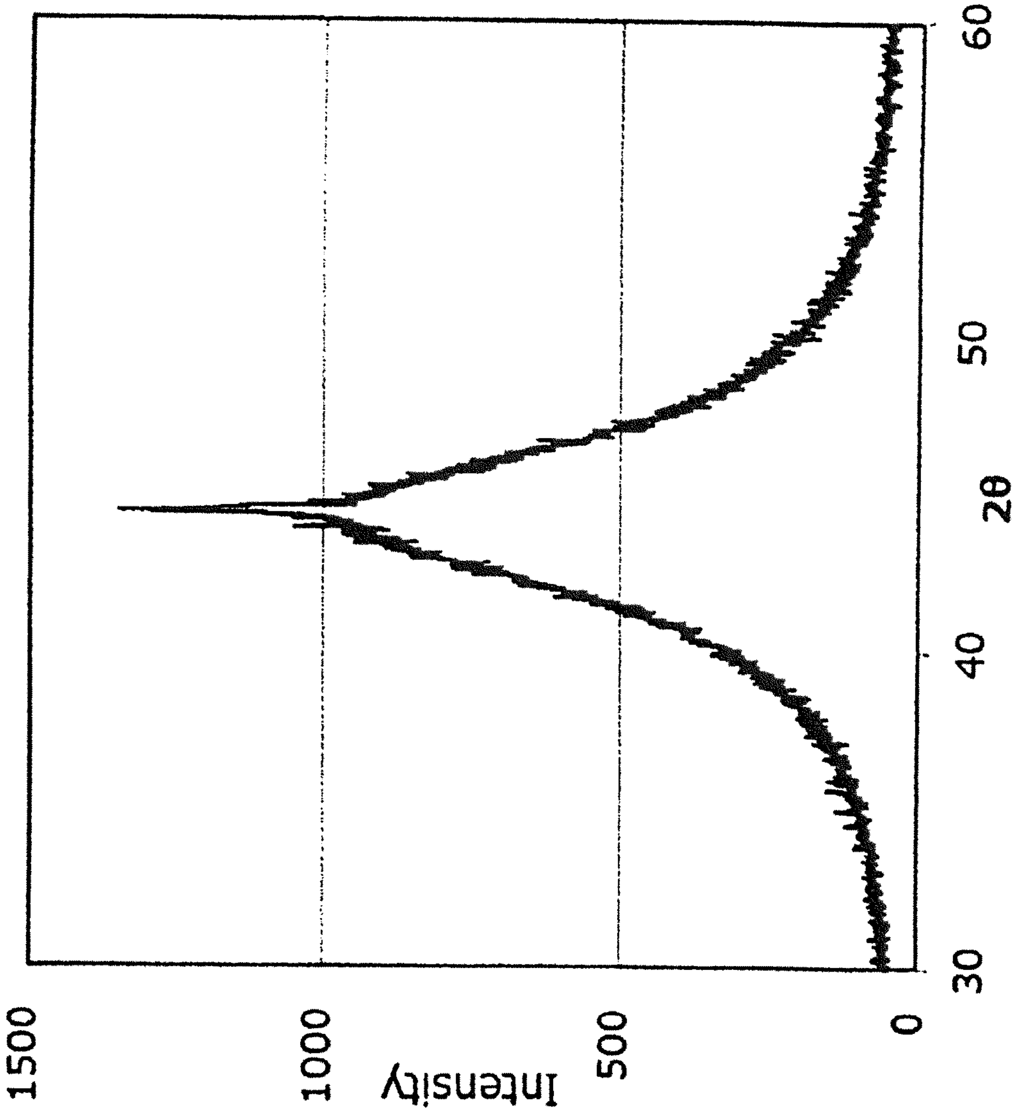
FIG. 4 is a chart obtained by X-ray crystal structure analysis.
Figure 5:
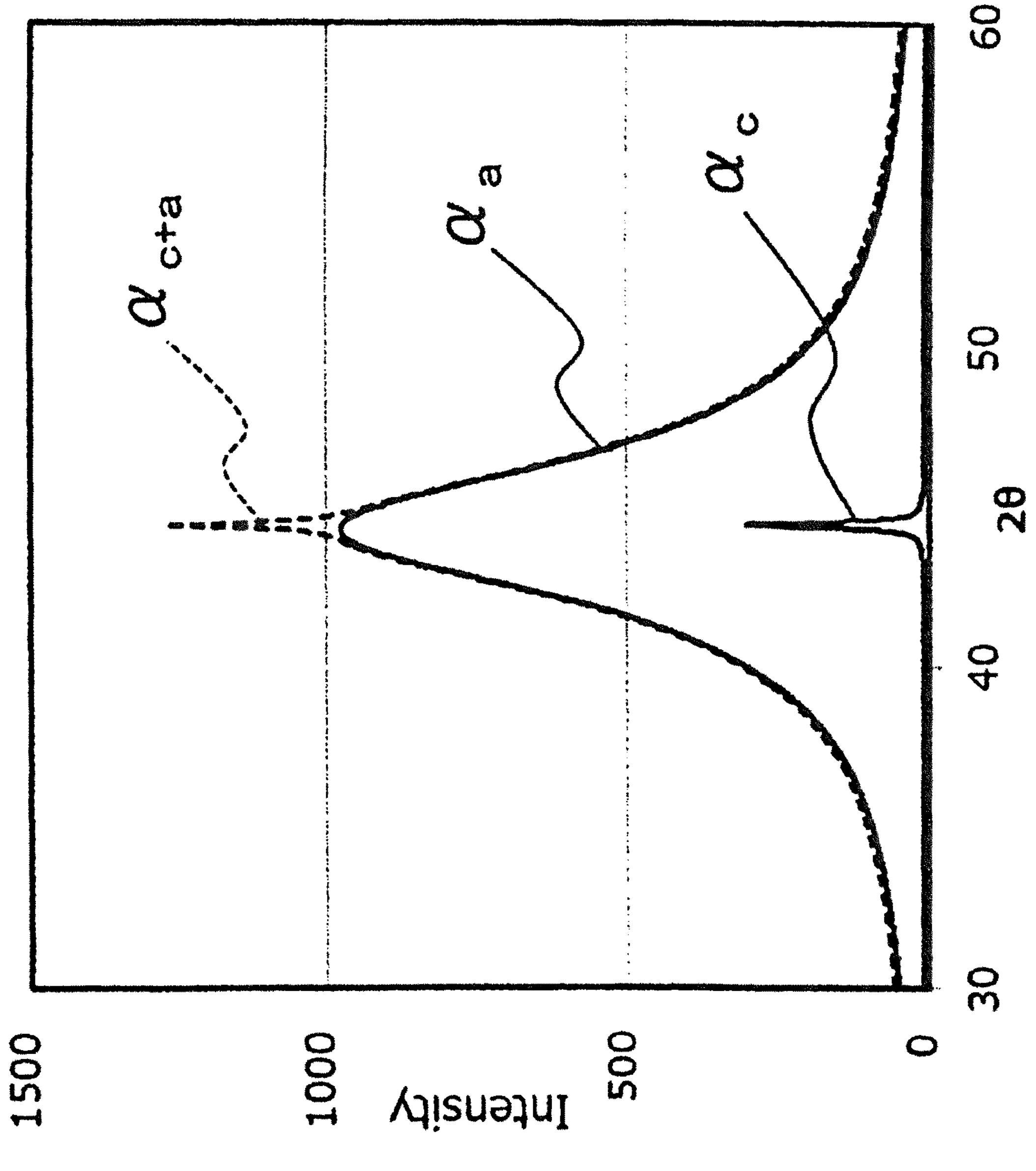
FIG. 5 is a pattern obtained by profile fitting the chart of FIG. 4.

The soft magnetic alloy powder according to the present embodiment is subjected to an X-ray crystal structure analysis by XRD so as to obtain a chart as shown in FIG. 4. This undergoes a profile fitting using the Lorentz function of the following formula (2) so as to obtain a crystal component pattern $\alpha_c$ representing a scattering integrated intensity of crystal phase, an amorphous component pattern $\alpha_a$ representing a scattering integrated intensity of amorphous phase, and a pattern $\alpha_{c+a}$ obtained by combining them as shown in FIG. 5. From the scattering integrated intensity of crystal phase and the scattering integrated intensity of amorphous phase of the obtained patterns, the amorphization rate X is calculated by the above-mentioned formula (1). Incidentally, the measurement range is diffraction angle 2θ=30°-60°, which can confirm a halo derived from amorphousness. In this range, an error between the integrated intensity actually measured by XRD and the integrated intensity calculated by the Lorentz function is controlled within 1%.

$$f(x)=\frac{h}{1+\frac{(x-u)^2}{w^2}}+b \quad (2)$$

h: peak height u: peak position w: half-value width b: background height

Incidentally, when nanocrystals are deposited in the soft magnetic alloy powder according to the present embodiment, many nanocrystals are deposited in each powder. That is, there is a difference between a particle size of the soft magnetic alloy powder and a crystal particle size of the nanocrystals mentioned below.

Hereinafter, each component of the soft magnetic alloy powder according to the present embodiment is explained in detail.

In the soft magnetic alloy powder according to the present embodiment, it is particularly important to favorably control the B content (b) and the S content (f). The soft magnetic alloy powder according to the present embodiment contains B and thereby has an effect of improving amorphousness and making it difficult to generate crystals. Moreover, the soft magnetic alloy powder according to the present embodiment contains S and can thereby make it difficult to generate nozzle clogging even if a nozzle has a small diameter in manufacturing the soft magnetic alloy powder by atomizing method. That is, the amount of hot water can be reduced, and it is thereby possible to reduce the particle size of the soft magnetic allow powder and to have a particle shape close to a sphere. Moreover, when the soft magnetic alloy powder is manufactured by a rotating-water-flow atomizing method mentioned below, a soft magnetic alloy powder having an amorphous phase structure is easily obtained by reducing the amount of hot water.

The B content (b) satisfies $0.020\le b\le0.200$. The B content (b) preferably satisfies $0.070\le b\le0.200$ and more preferably satisfies $0.070\le b\le0.110$. When the B content (b) is too small, large crystals having a crystal particle size of 100 nm or more are easily deposited in the soft magnetic alloy powder. If such crystals are deposited in the soft magnetic alloy powder, coercivity remarkably increases. When the B content (b) is too large, saturation magnetization easily decreases.

The S content (f) satisfies $0.0010\le f\le0.030$. The S content (f) preferably satisfies $0.0010\le f\le0.0050$. When the S content (f) is too small, nozzle clogging is easily generated if a nozzle has a small diameter. Thus, a nozzle cannot help having a large diameter. For a large diameter of a nozzle, the amount of hot water cannot help being large. When the amount of hot water is large, a cutting force by gas is dispersed, and the soft magnetic alloy powder cannot have a small particle size. The larger the particle size is, the further the particle shape is away from a sphere, and the further coercivity increases. When the S content (f) is too large, large crystals having a crystal particle size of 100 nm or more are easily deposited in the soft magnetic alloy powder. If the large crystals are deposited in the soft magnetic alloy powder, coercivity remarkably increases.

It is also important to set (S content)/(B content), that is, f/b to a predetermined range. Specifically, $0.005\le f/b\le1.50$ is satisfied. $0.005\le f/b\le0.500$ may be satisfied. Preferably, $0.011\le f/b\le0.056$ is satisfied.

M is one or more of Nb, Hf, Zr, Ta, Mo, W, Ti, and V.

The M content (a) satisfies $0\le a\le0.160$. That is, M may not be contained. Preferably, $0.070\le a\le0.160$ is satisfied. When the M content (a) is too large, saturation magnetization easily decreases.

The P content (c) satisfies $0\le c\le0.150$. That is, P may not be contained. The P content (c) preferably satisfies $0.010\le c\le0.150$ and more preferably satisfies $0.010\le c\le0.050$. When the P content (c) is too large, the particle shape is easily far from a sphere.

The Si content (d) satisfies $0\le d\le0.060$. That is, Si may not be contained. Preferably, the Si content (d) satisfies $0\le d\le0.020$. When the Si content (d) is too large, the particle shape is easily far from a sphere.

The C content (e) satisfies $0\le e\le0.030$. That is, C may not be contained. The C content (e) may satisfy $0\le e\le0.010$. When the C content (e) is too large, large crystals having a crystal particle size of 100 nm or more are easily deposited in the soft magnetic alloy powder. If such crystals are deposited in the soft magnetic alloy powder, coercivity remarkably increases.

The Fe content (1−(a+b+c+d+e+f)) is not limited, but 0.735≤(1−(a+b+c+d+e+f))≤0.900 is preferably satisfied. When the Fe content (1−(a+b+c+d+e+f)) is in this range, large crystals having a crystal particle size of more than 100 nm are less unlikely to be generated in the manufacture of the soft magnetic alloy powder.

In the soft magnetic alloy powder according to the present embodiment, a part of Fe may be substituted by X1 and/or X2.

X1 is one or more of Co and Ni. When X1 is Ni, there is an effect of reducing coercivity. When X1 is Co, there is an effect of improving saturation magnetization after heat treatment. The kind of X1 can appropriately be selected. The X1 content may be α=0. That is, X1 may not be contained. Preferably, the number of atoms of X1 is 40 at % or less provided that the number of atoms of the entire composition is 100 at %. That is, 0≤α{1−(a+b+c+d+e+f)}≤0.40 is preferably satisfied, and 0≤α{1−(a+b+c+d+e+f)}≤0.10 is more preferably satisfied.

X2 is one or more of Al, Mn, Ag, Zn, Sn, As, Sb, Cu, Cr, Bi, N, O, and rare earth elements. When X2 is contained, the fact that X2 is one or more of Al, Mn, Ag, Zn, Sn, As, Sb, Cu, Bi, N, O, and rare earth elements is favorable in view of easily obtaining the soft magnetic alloy powder having an amorphous phase structure. The X2 content may be β=0. That is, X2 may not be contained. Preferably, the number of atoms of X2 is 3.0 at % or less provided that the number of atoms of the entire composition is 100 at %. That is, 0≤β{1−(a+b+c+d+e+f)}≤0.030 is preferably satisfied.

The amount of substitution of Fe by X1 and/or X2 is a half of Fe based on the number of atoms. That is, 0≤α+β≤0.50 is satisfied. When α+β>0.50 is satisfied, it is difficult to obtain a soft magnetic alloy according to the present embodiment by heat treatment.

Incidentally, the soft magnetic alloy powder according to the present embodiment may contain inevitable impurities excluding the above-mentioned elements. For example, 0.1 wt % or less of the inevitable impurities may be contained with respect to 100 wt % of the soft magnetic alloy powder.

Hereinafter, explained is a method of evaluating a particle shape and a particle size (particle size distribution) of the soft magnetic alloy powder according to the present embodiment.

As described above, the closer the particle shape is to a sphere, the further the filling rate of the dust core or so using this soft magnetic alloy powder can be improved, and the further various characteristics, such as coercivity, can be improved. Moreover, the particle size is preferably smaller as the particle shape is more easily closer to a sphere.

In the present embodiment, the particle shape and the particle size are evaluated using an Morphologi G3 (Malvern Panalytical). The Morphologi G3 is a device for evaluating a projected shape of each particle of powder dispersed by air. The shapes of particles having a particle size of about 0.5 μm to several mm can be evaluated by an optical microscope or a laser microscope. Specifically, as understood from the measurement result 1 of the particle shapes shown in FIG. 1, many particle shapes can be projected and evaluated at one time, but much more particle shapes than those described in the measurement result 1 of the particle shapes shown in FIG. 1 can be actually projected and evaluated at one time.

Figure 2:
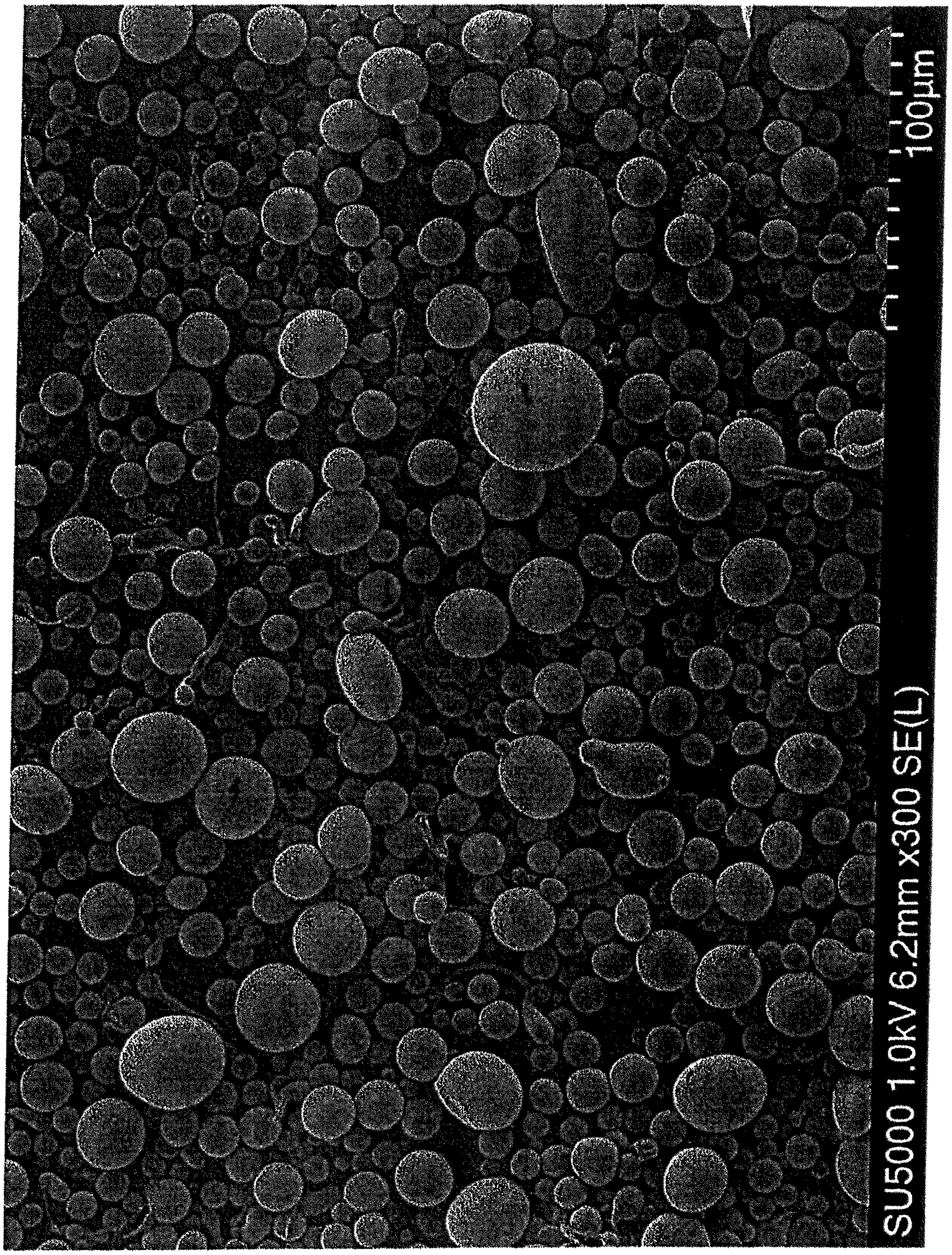
FIG. 2 is an observation result of Sample No. 15 by a SEM.
Figure 3:
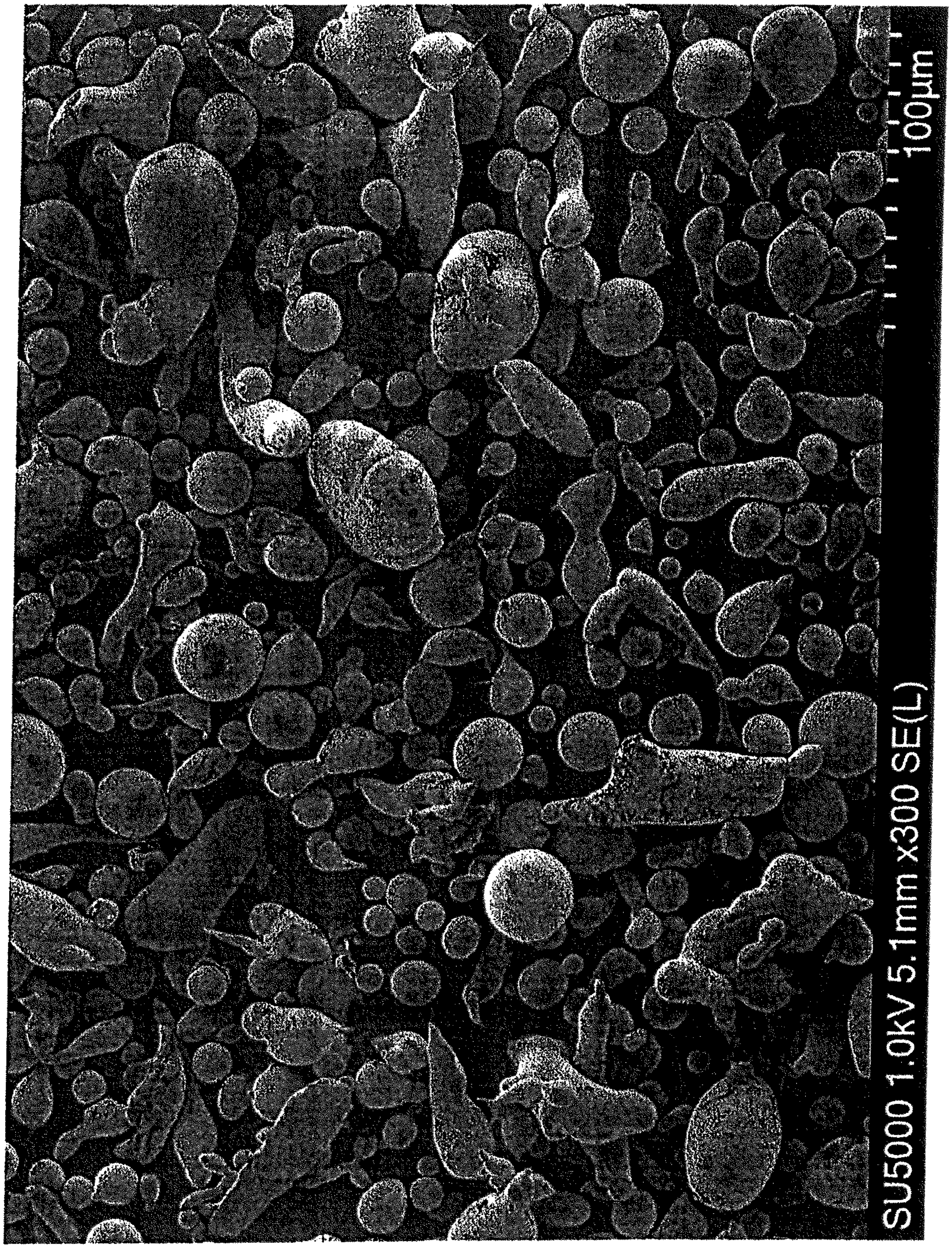
FIG. 3 is an observation result of Sample No. 11 by a SEM.

The Morphologi G3 can produce and evaluate projected views of many particles at one time and can thereby evaluate many particle shapes in a short time compared to conventional evaluation methods, such as SEM observation. In the following examples, for example, projected views of 20000 particles are produced, and an average circularity is calculated by automatically calculating circularities of the respective particles. On the other hand, the conventional SEM observation calculates a circularity of each particle using a SEM image as shown in FIG. 2 and FIG. 3 and is thereby hard to evaluate many particle shapes in a short time. Incidentally, FIG. 2 is Sample No. 15 mentioned below and is an example having a comparatively high circularity, and FIG. 3 is Sample No. 11 mentioned below and is a comparative example having a comparatively low circularity.

A circularity of a particle is represented by $4\pi 6/L^2$, where S is an area of the particle in a projected view, and L is a circumference length of the particle in the projected view. The circularity of a circle is one. A particle has a higher sphericity as a circularity of a projected view of the particle is closer to one.

A normal method of calculating a particle size (particle size distribution) is based on volume. On the other hand, when a particle size (particle size distribution) is evaluated using the Morphologi G3, the particle size (particle size distribution) can be evaluated based on volume or number.

In a normal method of evaluating a particle size based on volume, the degree of data reflection of each particle is proportional to the volume of each particle. That is, the degree of data reflection of small-sized particles is small.

In a method of evaluating a particle size based on number, however, the degrees of data reflection of particles are equal to each other. That is, the degrees of data reflection of small-sized particles are large.

Based on volume and number, the average particle size (D50) of the powder particles also changes. For example, when the average particle size (D50) of Sample No. 6a mentioned below is calculated using the Morphologi G3, the average particle size (D50) based on volume is 25.3 μm, while the average particle size (D50) based on number is 7.9 In the present embodiment and the examples mentioned below, the particle size is evaluated based on number.

In the present embodiment, the soft magnetic metal powder has any average particle size and may have an average particle size of 5.0 μm or more and 50 μm or less (preferably, 5.0 μm or more and 15 μm or less).

Hereinafter, explained are the evaluation parameters and the evaluation method of nanocrystals when they are contained in the soft magnetic alloy powder according to the present embodiment.

When nanocrystals are contained in the soft magnetic alloy powder according to the present embodiment, they are normally nanocrystals of αFe.

The nanocrystals of αFe can be evaluated by an average crystal particle size, a crystallinity, and a crystallinity of compound phase other than bcc phase in the nanocrystals of αFe (hereinafter, also referred to as a non-bcc-phase crystallinity). All of these parameters can be calculated by analyzing the measurement results of X-ray diffraction (XRD) using WPPD method.

The average crystal particle size may be 0.2 nm or more and 50 nm or less and is preferably 3 nm or more and 30 nm or less. When the average crystal particle size is large, coercivity tends to increase. When the average crystal particle size is small, saturation magnetization tends to decrease.

Preferably, the crystallinity is 25% or more. When the crystallinity is 25% or more, coercivity easily decreases, and saturation magnetization easily increases. That is, soft magnetic characteristics easily improve.

The non-bcc-phase crystallinity may be 7% or less and is preferably 5% or less (more preferably, 2% or less). When the non-bcc-phase crystallinity is low, coercivity tends to decrease.

Hereinafter, explained is a method of manufacturing the soft magnetic alloy powder according to the present embodiment.

The soft magnetic alloy powder according to the present embodiment is manufactured by any method, such as an atomizing method. The atomizing method may be any kind, such as a gas atomizing method and a rotating water atomization method. Hereinafter, explained is a method of manufacturing the soft magnetic alloy powder by a rotating water atomization method.

In the rotating water atomization method, compared to other atomizing methods (e.g., a gas atomizing method), a sprayed molten metal is quickly cooled by a coolant. Thus, the molten metal is hard to be crystalized, and an amorphous soft magnetic alloy powder is easily obtained.

In the rotating water atomization method, pure metals of metal elements contained in a soft magnetic alloy finally obtained are initially prepared and weighed to have the same composition as the soft magnetic alloy finally obtained. Then, the pure metals of the metal elements are melted and mixed to manufacture a mother alloy. Incidentally, the pure metals are melted by any method. For example, the pure metals are melted by high-frequency heating after a chamber is evacuated. Incidentally, the mother alloy and the soft magnetic alloy finally obtained normally have the same composition.

Next, the manufactured mother alloy is heated and melted to obtain a molten metal. The molten metal has any temperature, such as 1200 to 1500° C. After that, the molten alloy is sprayed against a coolant (normally, water or so) of a rotating-water-flow atomizing device to manufacture a powder.

The particle size and the circularity of the soft magnetic alloy powder can favorably be controlled by controlling the spray conditions.

The favorable spray conditions change based on the composition of the molten metal, the desired particle size, and the like, but are, for example, a nozzle diameter of 0.5 to 3 mm, a molten metal discharge amount of 1.5 kg/min or less, and a gas pressure of 5 to 10 MPa.

In the above-mentioned method, obtained is a soft magnetic alloy powder having an amorphous structure or a nanohetero structure where nanocrystals are present in amorphous phase. At this point, the soft magnetic alloy powder preferably has an amorphous structure for favorably controlling the particle shape and particle size (particle size distribution).

To favorably obtain a soft magnetic alloy powder containing nanocrystals (particularly, Fe based nanocrystals) and having a crystal phase structure, a heat treatment is preferably carried out for the soft magnetic alloy powder obtained by the above-mentioned rotating-water-flow atomizing method and having an amorphous phase structure. For example, when the heat treatment is carried out at 300 to 650° C. for 0.5 to 10 hours, the elements are promoted to be dispersed while the powder is prevented from being coarse due to sintering of each particle and can reach a thermodynamic equilibrium in a short time with removal of distortion and stress, and it becomes easy to obtain a soft magnetic alloy powder containing nanocrystals (particularly, Fe based nanocrystals) and having a crystal phase structure. Then, obtained is a soft magnetic alloy powder having a high saturation magnetization compared to a soft magnetic alloy powder having an amorphous phase structure.

The soft magnetic alloy powder according to the present embodiment is used for any purposes, such as for dust cores. In particular, the soft magnetic alloy powder according to the present embodiment can favorably be used as dust cores for inductors (particularly, power inductors). The soft magnetic alloy powder according to the present embodiment can be also favorably used for magnetic components, such as thin film inductors, magnetic heads, and the like. Moreover, dust cores and magnetic components using the soft magnetic alloy powder according to the present embodiment can favorably be used for electronic devices.

EXAMPLES

Hereinafter, the present invention is specifically explained based on examples.

Experimental Example 1

Each of pure metal materials was weighed so that a mother alloy having the composition shown in Table 1 shown below would be obtained. Then, a chamber was evacuated, and the pure meta materials were melted by high-frequency heating to manufacture the mother alloy.

After that, the manufactured mother alloy was heated and melted to be a molten metal at 1500° C., and the molten metal was thereafter sprayed with the composition shown in Table 1 by a gas atomizing method to manufacture a powder. A soft magnetic alloy powder of each sample was manufactured with nozzle diameter of 1 mm, molten metal discharge amount of 0.5 to 0.8 kg/min, gas pressure of 7 MPa, and gas spray temperature of 1500° C. In Experimental Example 1, the average particle size of each soft magnetic alloy powder based on number was controlled by classifying the powder manufactured with the above-mentioned conditions using a sieve.

Confirmed was whether the obtained soft magnetic alloy powders were composed of amorphous phase or crystal phase. The amorphization rate X of each ribbon was measured using an XRD. The soft magnetic alloy powder having an amorphization rate X of 85% or more was considered to be composed of amorphous phase. The soft magnetic alloy powder having an amorphization rate X of less than 85% was considered to be composed of crystal phase. The results are shown in Table 1. All of samples shown in Table 1 and samples of examples that were not subjected to heat treatment in the following experimental examples were composed of amorphous phase.

The coercivity of each soft magnetic alloy powder was measured using a Hc meter. The results are shown in Table 1. Incidentally, a coercivity of 3.0 Oe or less was considered to be favorable, and a coercivity of 1.0 Oe or less was considered to be more favorable. All of the samples shown in Table 1 had a coercivity of 3.0 Oe or less.

The particle shape of each of the obtained soft magnetic alloy powders was evaluated by measuring the average particle size based on number and the average circularity. The average particle size based on number and the average circularity were obtained from particle sizes and circularities of particles of each powder measured by observing shapes of 20000 particles of each powder at 10 times magnification using an Morphologi G3 (Malvern Panalytical). Specifically, a portion (volume: 3 cc) of the soft magnetic alloy powder was dispersed at an air pressure of 1 to 3 bar, and an image projected by a laser microscope was photographed. The average particle size based on number was calculated by averaging the particle sizes of the particles of each powder. The average circularity was measured by averaging the circularities of the particles of each powder. The results are shown in Table 1.

TABLE 1

| | | $Fe_{(1-(a+b+c+d+e+f))}M_aB_bP_cSi_dC_eS_f$ (α = β = 0) | | | | | | | | | | | |
|---|---|---|---|---|---|---|---|---|---|---|---|---|---|
| | | | | | | | | | | Characteristics of Powder | | | |
| Sample No. | Comp. Ex./ Ex. | Fe | M(Nb) a | B b | P c | Si d | C e | S f | S/B f/b | XRD | Coercivity/ Oe | Average Particle Size/μm | Average Circularity |
| 1 | Comp. Ex. | 0.810 | 0.070 | 0.090 | 0.030 | 0.000 | 0.000 | 0.0000 | 0.000 | amorphous phase | 5.3 | 5.0 | 0.87 |
| 2 | Comp. Ex. | 0.810 | 0.070 | 0.090 | 0.030 | 0.000 | 0.000 | 0.0000 | 0.000 | amorphous phase | 6.4 | 10 | 0.89 |
| 3 | Comp. Ex. | 0.810 | 0.070 | 0.090 | 0.030 | 0.000 | 0.000 | 0.0000 | 0.000 | amorphous phase | 10.3 | 15 | 0.85 |
| 4 | Comp. Ex. | 0.810 | 0.070 | 0.090 | 0.030 | 0.000 | 0.000 | 0.0000 | 0.000 | amorphous phase | 12.4 | 25 | 0.86 |
| 5 | Comp. Ex. | 0.810 | 0.070 | 0.090 | 0.030 | 0.000 | 0.000 | 0.0000 | 0.000 | amorphous phase | 25.3 | 50 | 0.84 |
| 6 | Ex. | 0.809 | 0.070 | 0.090 | 0.030 | 0.000 | 0.000 | 0.0010 | 0.011 | amorphous phase | 0.43 | 5.0 | 0.96 |
| 6a | Ex. | 0.809 | 0.070 | 0.090 | 0.030 | 0.000 | 0.000 | 0.0010 | 0.011 | amorphous phase | 0.75 | 7.6 | 0.96 |
| 7 | Ex. | 0.809 | 0.070 | 0.090 | 0.030 | 0.000 | 0.000 | 0.0010 | 0.011 | amorphous phase | 0.90 | 10 | 0.98 |
| 8 | Ex. | 0.809 | 0.070 | 0.090 | 0.030 | 0.000 | 0.000 | 0.0010 | 0.011 | amorphous phase | 0.95 | 15 | 0.96 |
| 9 | Ex. | 0.809 | 0.070 | 0.090 | 0.030 | 0.000 | 0.000 | 0.0010 | 0.011 | amorphous phase | 1.1 | 25 | 0.94 |
| 10 | Ex. | 0.809 | 0.070 | 0.090 | 0.030 | 0.000 | 0.000 | 0.0010 | 0.011 | amorphous phase | 1.3 | 50 | 0.90 |

According to Table 1, Sample No. 6 to Sample No. 10, which contained S and had the S content (f) and SB (f/b) within the predetermined ranges, had a favorable particle shape even if the average particle size based on number was changed. Moreover, Sample No. 6 to Sample No. 10 had a favorable coercivity.

On the other hand, Sample No. 1 to Sample No. 5, which did not contain S, had a small average circularity compared to a sample having a similar average particle size among Sample No. 6 to Sample No. 10, which contained S.

Experimental Example 2

Experimental Example 2 was carried out with the same conditions as Sample No. 6a of Experimental Example 1, except that the mother alloys were manufactured by weighing the raw material metals so that the alloy compositions of Examples and Comparative Examples shown in the following tables would be obtained and melting the weighed raw material metals by high-frequency heating.

TABLE 2

| | | $Fe_{(1-(a+b+c+d+e+f))}M_aB_bP_cSi_dC_eS_f$ (α = β = 0) | | | | | | | | | | | |
|---|---|---|---|---|---|---|---|---|---|---|---|---|---|
| | | | | | | | | | | Characteristics of Powder | | | |
| Sample No. | Comp. Ex./ Ex. | Fe | M(Nb) a | B b | P c | Si d | C e | S f | S/B f/b | XRD | Coercivity/ Oe | Average Particle Size/μm | Average Circularity |
| 11 | Comp. Ex. | 0.840 | 0.070 | 0.090 | 0.000 | 0.000 | 0.000 | 0.0000 | 0.000 | amorphous phase | 5.80 | 15 | 0.83 |
| 12 | Comp. Ex. | 0.830 | 0.070 | 0.100 | 0.000 | 0.000 | 0.000 | 0.0000 | 0.000 | amorphous phase | 4.80 | 17 | 0.78 |
| 13 | Comp. Ex. | 0.820 | 0.070 | 0.110 | 0.000 | 0.000 | 0.000 | 0.0000 | 0.000 | Spraying could not be carried out. | | | |
| 14 | Comp. Ex. | 0.840 | 0.070 | 0.090 | 0.000 | 0.000 | 0.000 | 0.0005 | 0.006 | amorphous phase | 3.80 | 13 | 0.86 |
| 15 | Ex. | 0.839 | 0.070 | 0.090 | 0.000 | 0.000 | 0.000 | 0.0010 | 0.011 | amorphous phase | 1.20 | 8.3 | 0.95 |
| 16 | Ex. | 0.838 | 0.070 | 0.090 | 0.000 | 0.000 | 0.000 | 0.0020 | 0.022 | amorphous phase | 1.20 | 7.8 | 0.94 |
| 17 | Ex. | 0.835 | 0.070 | 0.090 | 0.000 | 0.000 | 0.000 | 0.0050 | 0.056 | amorphous phase | 1.10 | 7.6 | 0.95 |
| 18 | Ex. | 0.830 | 0.070 | 0.090 | 0.000 | 0.000 | 0.000 | 0.0100 | 0.111 | amorphous phase | 1.30 | 7.3 | 0.93 |
| 19 | Ex. | 0.810 | 0.070 | 0.090 | 0.000 | 0.000 | 0.000 | 0.0300 | 0.333 | amorphous phase | 1.50 | 7.8 | 0.92 |
| 20 | Comp. Ex. | 0.790 | 0.070 | 0.090 | 0.000 | 0.000 | 0.000 | 0.0500 | 0.556 | crystal phase | 183 | 7.3 | 0.96 |

TABLE 3

| | | $Fe_{(1-(a+b+c+d+e+f))}M_aB_bP_cSi_dC_eS_f$ (α = β = 0) | | | | | | | | | | | |
|---|---|---|---|---|---|---|---|---|---|---|---|---|---|
| | | | | | | | | | | Characteristics of Powder | | | |
| Sample No. | Comp. Ex./ Ex. | Fe | M(Nb) a | B b | P c | Si d | C e | S f | S/B f/b | XRD | Coercivity/ Oe | Average Particle Size/μm | Average Circularity |
| 15 | Ex. | 0.839 | 0.070 | 0.090 | 0.000 | 0.000 | 0.000 | 0.0010 | 0.011 | amorphous phase | 1.20 | 8.3 | 0.95 |
| 21 | Ex. | 0.829 | 0.070 | 0.090 | 0.010 | 0.000 | 0.000 | 0.0010 | 0.011 | amorphous phase | 0.90 | 7.5 | 0.95 |
| 6a | Ex. | 0.809 | 0.070 | 0.090 | 0.030 | 0.000 | 0.000 | 0.0010 | 0.011 | amorphous phase | 0.75 | 7.6 | 0.96 |
| 22 | Ex. | 0.789 | 0.070 | 0.090 | 0.050 | 0.000 | 0.000 | 0.0010 | 0.011 | amorphous phase | 0.78 | 7.3 | 0.95 |
| 23 | Ex. | 0.739 | 0.070 | 0.090 | 0.100 | 0.000 | 0.000 | 0.0010 | 0.011 | amorphous phase | 0.83 | 7.9 | 0.94 |
| 24 | Ex. | 0.689 | 0.070 | 0.090 | 0.150 | 0.000 | 0.000 | 0.0010 | 0.011 | amorphous phase | 0.85 | 7.8 | 0.92 |
| 25 | Comp. Ex. | 0.679 | 0.070 | 0.090 | 0.160 | 0.000 | 0.000 | 0.0010 | 0.011 | amorphous phase | 0.82 | 7.3 | 0.89 |

TABLE 4

| Sample No. | Comp. Ex./ Ex. | Fe | M(Nb) a | B b | P c | Si d | C e | S f | S/B f/b | XRD | Coercivity/ Oe | Average Particle Size/μm | Average Circularity |
|---|---|---|---|---|---|---|---|---|---|---|---|---|---|
| | | $Fe_{(1-(a+b+c+d+e+f))}M_aB_bP_cSi_dC_eS_f$ (α = β = 0) | | | | | | | | Characteristics of Powder | | | |
| 31 | Comp. Ex. | 0.889 | 0.070 | 0.010 | 0.030 | 0.000 | 0.000 | 0.0010 | 0.100 | crystal phase | 164 | 16 | 0.94 |
| 32 | Ex. | 0.879 | 0.070 | 0.020 | 0.030 | 0.000 | 0.000 | 0.0010 | 0.050 | amorphous phase | 1.50 | 7.9 | 0.94 |
| 33 | Ex. | 0.829 | 0.070 | 0.070 | 0.030 | 0.000 | 0.000 | 0.0010 | 0.014 | amorphous phase | 0.90 | 7.4 | 0.95 |
| 6a | Ex. | 0.809 | 0.070 | 0.090 | 0.030 | 0.000 | 0.000 | 0.0010 | 0.011 | amorphous phase | 0.75 | 7.6 | 0.96 |
| 34 | Ex. | 0.749 | 0.070 | 0.150 | 0.030 | 0.000 | 0.000 | 0.0010 | 0.007 | amorphous phase | 0.82 | 7.9 | 0.93 |
| 35 | Ex. | 0.699 | 0.070 | 0.200 | 0.030 | 0.000 | 0.000 | 0.0010 | 0.005 | amorphous phase | 0.86 | 7.4 | 0.90 |
| 36 | Comp. Ex. | 0.689 | 0.070 | 0.210 | 0.030 | 0.000 | 0.000 | 0.0010 | 0.005 | amorphous phase | 1.20 | 7.3 | 0.88 |

TABLE 5

| Sample No. | Comp. Ex./ Ex. | Fe | M(Nb) a | B b | P c | Si d | C e | S f | S/B f/b | XRD | Coercivity/ Oe | Average Particle Size/μm | Average Circularity |
|---|---|---|---|---|---|---|---|---|---|---|---|---|---|
| | | $Fe_{(1-(a+b+c+d+e+f))}M_aB_bP_cSi_dC_eS_f$ (α = β = 0) | | | | | | | | Characteristics of Powder | | | |
| 6a | Ex. | 0.809 | 0.070 | 0.090 | 0.030 | 0.000 | 0.000 | 0.0010 | 0.011 | amorphous phase | 0.75 | 7.6 | 0.96 |
| 41 | Ex. | 0.799 | 0.070 | 0.090 | 0.030 | 0.000 | 0.010 | 0.0010 | 0.011 | amorphous phase | 0.72 | 6.8 | 0.97 |
| 42 | Ex. | 0.779 | 0.070 | 0.090 | 0.030 | 0.000 | 0.030 | 0.0010 | 0.011 | amorphous phase | 0.81 | 7.4 | 0.96 |
| 43 | Comp. Ex. | 0.759 | 0.070 | 0.090 | 0.030 | 0.000 | 0.050 | 0.0010 | 0.011 | crystal phase | 135 | 7.6 | 0.96 |

TABLE 6

| Sample No. | Comp. Ex./ Ex. | Fe | M(Nb) a | B b | P c | Si d | C e | S f | S/B f/b | XRD | Coercivity/ Oe | Average Particle Size/μm | Average Circularity |
|---|---|---|---|---|---|---|---|---|---|---|---|---|---|
| | | $Fe_{(1-(a+b+c+d+e+f))}M_aB_bP_cSi_dC_eS_f$ (α = β = 0) | | | | | | | | Characteristics of Powder | | | |
| 6a | Ex. | 0.809 | 0.070 | 0.090 | 0.030 | 0.000 | 0.000 | 0.0010 | 0.011 | amorphous phase | 0.75 | 7.6 | 0.96 |
| 51 | Ex. | 0.789 | 0.070 | 0.090 | 0.030 | 0.020 | 0.000 | 0.0010 | 0.011 | amorphous phase | 0.83 | 7.4 | 0.95 |
| 52 | Ex. | 0.769 | 0.070 | 0.090 | 0.030 | 0.040 | 0.000 | 0.0010 | 0.011 | amorphous phase | 0.85 | 7.4 | 0.94 |
| 53 | Ex. | 0.749 | 0.070 | 0.090 | 0.030 | 0.060 | 0.000 | 0.0010 | 0.011 | amorphous phase | 0.94 | 7.2 | 0.93 |
| 54 | Comp. Ex. | 0.739 | 0.070 | 0.090 | 0.030 | 0.070 | 0.000 | 0.0010 | 0.011 | amorphous phase | 1.10 | 8.2 | 0.89 |

TABLE 7

| Sample No. | Comp. Ex./ Ex. | Fe | M(Nb) a | B b | P c | Si d | C e | S f | S/B f/b | XRD | Coercivity/ Oe | Average Particle Size/μm | Average Circularity |
|---|---|---|---|---|---|---|---|---|---|---|---|---|---|
| | | $Fe_{(1-(a+b+c+d+e+f))}M_aB_bP_cSi_dC_eS_f$ (α = β = 0) | | | | | | | | Characteristics of Powder | | | |
| 61 | Ex. | 0.839 | 0.000 | 0.090 | 0.030 | 0.040 | 0.000 | 0.0010 | 0.011 | amorphous phase | 0.93 | 6.8 | 0.96 |
| 62 | Ex. | 0.829 | 0.010 | 0.090 | 0.030 | 0.040 | 0.000 | 0.0010 | 0.011 | amorphous phase | 0.94 | 7.2 | 0.94 |
| 63 | Ex. | 0.809 | 0.030 | 0.090 | 0.030 | 0.040 | 0.000 | 0.0010 | 0.011 | amorphous phase | 0.92 | 7.4 | 0.96 |
| 52 | Ex. | 0.769 | 0.070 | 0.090 | 0.030 | 0.040 | 0.000 | 0.0010 | 0.011 | amorphous phase | 0.85 | 7.4 | 0.94 |
| 64 | Ex. | 0.749 | 0.090 | 0.090 | 0.030 | 0.040 | 0.000 | 0.0010 | 0.011 | amorphous phase | 0.87 | 7.6 | 0.96 |
| 65 | Ex. | 0.689 | 0.150 | 0.090 | 0.030 | 0.040 | 0.000 | 0.0010 | 0.011 | amorphous phase | 0.88 | 7.8 | 0.95 |
| 66 | Ex. | 0.679 | 0.160 | 0.090 | 0.030 | 0.040 | 0.000 | 0.0010 | 0.011 | amorphous phase | 0.82 | 7.6 | 0.96 |

TABLE 8

| Sample No. | Comp. Ex./ Ex. | $Fe_{(1-(a+b+c+d+e+f))}M_aB_bP_cSi_dC_eS_f$ (a-f were the same as those of Sample No. 6a, $\alpha = \beta = 0$) M Kind | Characteristics of Powder XRD | Coercivity/ Oe | Average Particle Size/μm | Average Circularity |
|---|---|---|---|---|---|---|
| 6a | Ex. | Nb | amorphous phase | 0.75 | 7.6 | 0.96 |
| 71 | Ex. | Hf | amorphous phase | 0.80 | 7.6 | 0.95 |
| 72 | Ex. | Zr | amorphous phase | 0.77 | 7.5 | 0.95 |
| 73 | Ex. | Ta | amorphous phase | 0.75 | 7.6 | 0.95 |
| 74 | Ex. | Mo | amorphous phase | 0.78 | 7.8 | 0.96 |
| 75 | Ex. | W | amorphous phase | 0.79 | 7.9 | 0.95 |
| 76 | Ex. | V | amorphous phase | 0.81 | 7.5 | 0.96 |
| 77 | Ex. | Ti | amorphous phase | 0.85 | 7.4 | 0.95 |
| 78 | Ex. | $Nb_{0.5}Hf_{0.5}$ | amorphous phase | 0.77 | 7.5 | 0.95 |
| 79 | Ex. | $Zr_{0.5}Ta_{0.5}$ | amorphous phase | 0.74 | 7.6 | 0.96 |
| 80 | Ex. | $Nb_{0.4}Hf_{0.3}Zr_{0.3}$ | amorphous phase | 0.75 | 7.8 | 0.95 |

TABLE 9

| | | $Fe_{(1-(\alpha+\beta))}X1_{\alpha}X2_{\beta}$ (a-f were the same as those of Sample No. 6a, M was Nb) | | | | Characteristics of Powder | | | |
|---|---|---|---|---|---|---|---|---|---|
| | | X1 | | X2 | | | | Average | |
| Sample No. | Comp. Ex./ Ex. | Kind | α {1 − (a + b + c + d + e + f)} | Kind | β {1 − (a + b + c + d + e + f)} | XRD | Coercivity/ Oe | Particle Size/μm | Average Circularity |
| 6a | Ex. | — | 0.000 | — | 0.000 | amorphous phase | 0.75 | 7.6 | 0.96 |
| 81 | Ex. | Co | 0.010 | — | 0.000 | amorphous phase | 0.89 | 7.4 | 0.95 |
| 82 | Ex. | Co | 0.100 | — | 0.000 | amorphous phase | 1.00 | 7.5 | 0.95 |
| 83 | Ex. | Co | 0.400 | — | 0.000 | amorphous phase | 1.21 | 7.4 | 0.96 |
| 84 | Ex. | Ni | 0.010 | — | 0.000 | amorphous phase | 0.75 | 7.5 | 0.96 |
| 85 | Ex. | Ni | 0.100 | — | 0.000 | amorphous phase | 0.71 | 7.6 | 0.96 |
| 86 | Ex. | Ni | 0.400 | — | 0.000 | amorphous phase | 0.68 | 7.9 | 0.95 |

TABLE 10

| | | $Fe_{(1-(\alpha+\beta))}X1_{\alpha}X2_{\beta}$ (a-f were the same as those of Sample No. 6a, M was Nb) | | | | Characteristics of Powder | | | |
|---|---|---|---|---|---|---|---|---|---|
| | | X1 | | X2 | | | | Average | |
| Sample No. | Comp. Ex./ Ex. | Kind | α {1 − (a + b + c + d + e + f)} | Kind | β {1 − (a + b + c + d + e + f)} | XRD | Coercivity/ Oe | Particle Size/μm | Average Circularity |
| 6a | Ex. | — | 0.000 | — | 0.000 | amorphous phase | 0.75 | 7.6 | 0.96 |
| 91 | Ex. | — | 0.000 | Al | 0.001 | amorphous phase | 0.64 | 7.8 | 0.96 |
| 92 | Ex. | — | 0.000 | Al | 0.005 | amorphous phase | 0.75 | 7.5 | 0.96 |
| 93 | Ex. | — | 0.000 | Al | 0.010 | amorphous phase | 0.71 | 7.8 | 0.95 |
| 94 | Ex. | — | 0.000 | Al | 0.030 | amorphous phase | 0.75 | 7.8 | 0.96 |
| 95 | Ex. | — | 0.000 | Zn | 0.001 | amorphous phase | 0.79 | 7.8 | 0.97 |
| 96 | Ex. | — | 0.000 | Zn | 0.005 | amorphous phase | 0.79 | 7.6 | 0.96 |
| 97 | Ex. | — | 0.000 | Zn | 0.010 | amorphous phase | 0.75 | 7.6 | 0.95 |
| 98 | Ex. | — | 0.000 | Zn | 0.030 | amorphous phase | 0.79 | 7.5 | 0.96 |
| 99 | Ex. | — | 0.000 | Sn | 0.001 | amorphous phase | 0.79 | 7.6 | 0.96 |
| 100 | Ex. | — | 0.000 | Sn | 0.005 | amorphous phase | 0.75 | 7.9 | 0.96 |
| 101 | Ex. | — | 0.000 | Sn | 0.010 | amorphous phase | 0.75 | 7.4 | 0.97 |
| 102 | Ex. | — | 0.000 | Sn | 0.030 | amorphous phase | 0.82 | 7.5 | 0.96 |
| 103 | Ex. | — | 0.000 | Cu | 0.001 | amorphous phase | 0.68 | 7.3 | 0.96 |
| 104 | Ex. | — | 0.000 | Cu | 0.005 | amorphous phase | 0.68 | 7.4 | 0.96 |
| 105 | Ex. | — | 0.000 | Cu | 0.010 | amorphous phase | 0.64 | 7.5 | 0.95 |
| 106 | Ex. | — | 0.000 | Cu | 0.030 | amorphous phase | 0.68 | 7.5 | 0.96 |

TABLE 11

| | | $Fe_{(1-(\alpha+\beta))}X1_{\alpha}X2_{\beta}$ (a-f were the same as those of Sample No. 6a, M was Nb) | | | | | Characteristics of Powder | | |
|---|---|---|---|---|---|---|---|---|---|
| | | X1 | | X2 | | | | | |
| Sample No. | Comp. Ex./ Ex. | Kind | α {1 − ( a + b + c + d + e + f)} | Kind | β {1 − (a + b + c + d + e + f)} | XRD | Coercivity/ Oe | Average Particle Size/μm | Average Circularity |
| 6a | Ex. | — | 0.000 | — | 0.000 | amorphous phase | 0.75 | 7.6 | 0.96 |
| 111 | Ex. | — | 0.000 | Cr | 0.001 | amorphous phase | 0.79 | 7.4 | 0.95 |
| 112 | Ex. | — | 0.000 | Cr | 0.005 | amorphous phase | 0.71 | 7.5 | 0.96 |
| 113 | Ex. | — | 0.000 | Cr | 0.010 | amorphous phase | 0.71 | 7.8 | 0.96 |
| 115 | Ex. | — | 0.000 | Bi | 0.001 | amorphous phase | 0.75 | 7.6 | 0.96 |
| 116 | Ex. | — | 0.000 | Bi | 0.005 | amorphous phase | 0.71 | 7.5 | 0.96 |
| 117 | Ex. | — | 0.000 | Bi | 0.010 | amorphous phase | 0.71 | 7.3 | 0.96 |
| 118 | Ex. | — | 0.000 | Bi | 0.030 | amorphous phase | 0.82 | 7.3 | 0.95 |
| 119 | Ex. | — | 0.000 | La | 0.001 | amorphous phase | 0.79 | 7.3 | 0.96 |
| 120 | Ex. | — | 0.000 | La | 0.005 | amorphous phase | 0.82 | 7.4 | 0.96 |
| 121 | Ex. | — | 0.000 | La | 0.010 | amorphous phase | 0.86 | 7.5 | 0.96 |
| 122 | Ex. | — | 0.000 | La | 0.030 | amorphous phase | 0.89 | 7.4 | 0.96 |
| 123 | Ex. | — | 0.000 | Y | 0.001 | amorphous phase | 0.82 | 7.5 | 0.95 |
| 124 | Ex. | — | 0.000 | Y | 0.005 | amorphous phase | 0.79 | 7.4 | 0.96 |
| 125 | Ex. | — | 0.000 | Y | 0.010 | amorphous phase | 0.79 | 7.5 | 0.95 |
| 126 | Ex. | — | 0.000 | Y | 0.030 | amorphous phase | 0.79 | 7.5 | 0.96 |

TABLE 12

| | | $Fe_{(1-(\alpha+\beta))}X1_{\alpha}X2_{\beta}$ (a-f were the same as those of Sample No. 6a, M was Nb) | | | | | Characteristics of Powder | | |
|---|---|---|---|---|---|---|---|---|---|
| | | X1 | | X2 | | | | | |
| Sample No. | Comp. Ex./ Ex. | Kind | α {1 − (a + b + c + d + e + f)} | Kind | β {1 − (a + b + c + d + e + f)} | XRD | Coercivity/ Oe | Average Particle Size/μm | Average Circularity |
| 6a | Ex. | — | 0.000 | — | 0.000 | amorphous phase | 0.75 | 7.6 | 0.96 |
| 131 | Ex. | Co | 0.100 | Al | 0.005 | amorphous phase | 0.86 | 7.5 | 0.95 |
| 132 | Ex. | Co | 0.100 | Zn | 0.005 | amorphous phase | 0.93 | 7.4 | 0.96 |
| 133 | Ex. | Co | 0.100 | Sn | 0.005 | amorphous phase | 0.96 | 7.4 | 0.95 |
| 134 | Ex. | Co | 0.100 | Cu | 0.005 | amorphous phase | 0.82 | 7.4 | 0.95 |
| 135 | Ex. | Co | 0.100 | Cr | 0.005 | amorphous phase | 0.86 | 7.5 | 0.96 |
| 136 | Ex. | Co | 0.100 | Bi | 0.005 | amorphous phase | 0.89 | 7.5 | 0.95 |
| 137 | Ex. | Co | 0.100 | La | 0.005 | amorphous phase | 0.93 | 7.4 | 0.95 |
| 138 | Ex. | Co | 0.100 | Y | 0.005 | amorphous phase | 0.96 | 7.5 | 0.96 |
| 139 | Ex. | Ni | 0.100 | Al | 0.005 | amorphous phase | 0.71 | 7.5 | 0.96 |
| 140 | Ex. | Ni | 0.100 | Zn | 0.005 | amorphous phase | 0.71 | 7.8 | 0.96 |
| 141 | Ex. | Ni | 0.100 | Sn | 0.005 | amorphous phase | 0.68 | 7.5 | 0.95 |
| 142 | Ex. | Ni | 0.100 | Cu | 0.005 | amorphous phase | 0.71 | 7.5 | 0.96 |
| 143 | Ex. | Ni | 0.100 | Cr | 0.005 | amorphous phase | 0.68 | 7.8 | 0.95 |
| 144 | Ex. | Ni | 0.100 | Bi | 0.005 | amorphous phase | 0.71 | 7.5 | 0.95 |
| 145 | Ex. | Ni | 0.100 | La | 0.005 | amorphous phase | 0.64 | 7.5 | 0.95 |
| 146 | Ex. | Ni | 0.100 | Y | 0.005 | amorphous phase | 0.79 | 7.5 | 0.96 |

Table 2 shows examples and comparative examples whose B content (b) and S content (f) were changed. The example whose components were within the predetermined ranges had a favorable particle shape and a favorable coercivity.

On the other hand, Sample No. 11 and Sample No. 12, which did not contain S, had a comparatively large average particle size, a comparatively low average circularity, and an increased coercivity, compared to other examples subjected with the same conditions except for the S content (f). In Sample No. 13, which did not contain S and had a large B content, a metal spraying could not be carried out, and a soft magnetic alloy powder could not be manufactured. Sample No. 14, whose S content (f) was too small, had a comparatively low average circularity and an increased coercivity. In Sample No. 20, whose S content (f) was too large, the soft magnetic alloy powder was composed of crystal phase, and the coercivity was remarkably increased.

Incidentally, FIG. 2 is an observation result of Sample No. 15 by a SEM, and FIG. 3 is an observation result of Sample No. 11 by a SEM. Compared to Sample No. 11, whose average circularity was low, Sample No. 15, whose average circularity was high, had a high sphericity.

Table 3 shows examples and a comparative example whose P content (c) was changed. The example whose components were within the predetermined ranges had a favorable particle shape and a favorable coercivity.

On the other hand, Sample No. 25, whose P content (c) was too large, had a comparatively low average circularity.

Table 4 shows examples and comparative examples whose B content (c) was changed. The example whose components were within the predetermined ranges had a favorable particle shape and a favorable coercivity.

On the other hand, in Sample No. 31, whose B content (b) was too small, the soft magnetic alloy powder was composed of crystal phase, and the coercivity was remarkably increased. Sample No. 36, whose B (b) content was too large, had a comparatively low average circularity.

Table 5 shows examples and a comparative example whose C content (e) was changed. The example whose components were within the predetermined ranges had a favorable particle shape and a favorable coercivity.

On the other hand, in Sample No. 43, whose C content (e) was too large, the soft magnetic alloy powder was composed of crystal phase, and the coercivity was remarkably increased.

Table 6 shows examples and a comparative example whose Si content (d) was changed. The example whose components were within the predetermined ranges had a favorable particle shape and a favorable coercivity.

On the other hand, Sample No. 54, whose Si content (d) was too large, had a comparatively low average circularity.

Table 7 shows examples whose M content (a) was changed in terms of Sample No 52 of Table 6. The example whose components were within the predetermined ranges had a favorable particle shape and a favorable coercivity.

Table 8 shows examples whose kind of M was changed in terms of Sample No 6a. These examples had a favorable particle shape even if the kind of M was changed within the scope of the present invention. Moreover, these examples had a favorable coercivity Table 9 to Table 12 show examples whose kind and amount of X1 and/or X2 were changed in terms of Sample No. 6a. The example whose components were within the predetermined ranges had a favorable particle shape and a favorable coercivity.

Experimental Example 3

In Experimental Example 3, a soft magnetic alloy powder obtained by gas atomizing method (Sample No. 6a) was subjected to a heat treatment so as to generate nanocrystals. At this time, the heat treatment conditions were changed to those shown in Table 13. Then, calculated were an average particle size of the nanocrystals, a crystallinity of the nanocrystals, and a crystallinity of compound phase other than bcc phase in the nanocrystals (hereinafter, also referred to as a non-bcc-phase crystallinity). Moreover, the coercivity and the saturation magnetization of the obtained soft magnetic alloy powder were measured. Incidentally, the average particle size and the average circularity of each example of Experimental Example 3 did not largely change from those of Sample No. 6a before the heat treatment.

The average particle size of the nanocrystals, the crystallinity of the nanocrystals, and the non-bcc-phase crystallinity were calculated by analyzing the measurement results, which were obtained using an X-ray diffraction measurement (XRD), by WPPD method. The saturation magnetization was measured at a magnetic field of 1000 kA/m using a vibrating sample magnetometer (VSM). The results are shown in Table 13. In Experimental Example 3, a saturation magnetization of 0.80 T or more was considered to be favorable, and a saturation magnetization of 1.30 T or more was considered to be more favorable. Incidentally, the object of the present invention can be overcome even if the saturation magnetization is not favorable in light of the standard of Experimental Example 3.

TABLE 13

| | | Conditions other than heat treatment condition were the same as those of Sample No. 6a. | | | | | | |
|---|---|---|---|---|---|---|---|---|
| | | Heat | | Characteristics of Powder | | | | |
| Sample No. | Comp. Ex./ Ex. | Treatment Temperature/ ° C. | Heat Treatment Time/h | Average Crystal Particle Size of Nanocrystals/nm | Crystallinity of Nanocrystals/% | Crystallinity of Non-bcc-phase/% | Coercivity/ Oe | Saturation Magnetization/T |
| 6a | Ex. | none | | none | 0 | none | 0.75 | 0.60 |
| 151 | Ex. | 300 | 0.5 | 0.2 | <1 | none | 0.77 | 0.70 |
| 152 | Ex. | 350 | 0.5 | 0.3 | <1 | none | 0.83 | 0.80 |
| 153 | Ex. | 450 | 0.5 | 3 | 12 | none | 0.84 | 1.31 |
| 154 | Ex. | 500 | 0.5 | 5 | 25 | none | 0.82 | 1.40 |
| 155 | Ex. | 550 | 0.5 | 10 | 34 | none | 0.78 | 1.45 |
| 156 | Ex. | 575 | 0.5 | 13 | 50 | none | 0.74 | 1.48 |
| 157 | Ex. | 600 | 0.5 | 10 | 65 | none | 0.64 | 1.53 |
| 158 | Ex. | 600 | 1 | 12 | 69 | none | 0.84 | 1.52 |
| 159 | Ex. | 600 | 10 | 17 | 73 | 2 | 0.96 | 1.52 |
| 160 | Ex. | 650 | 1 | 30 | 74 | 2 | 0.93 | 1.54 |
| 161 | Ex. | 650 | 10 | 50 | 75 | 7 | 2.80 | 1.54 |

According to Table 13, all examples whose composition was within a predetermined range even if subjected to a heat treatment had a favorable coercivity and a favorable saturation magnetization.

Compared to Sample No. 6a, which did not contain nanocrystals, Sample No. 151 to Sample No. 161, which contained nanocrystals, had an improved saturation magnetization. In particular, Sample No. 154 to Sample No. 161, whose crystallinity of nanocrystals was 25% or more, had a further improved saturation magnetization.

Compared to Sample No. 161, Sample No 6a and Sample No. 151 to Sample No. 160, whose non-bcc-phase crystallinity was 5% or less, had a favorable coercivity.

DESCRIPTION OF THE REFERENCE NUMERICAL

1 . . . measurement result of particle shapes

What is claimed is:

1. A soft magnetic alloy powder comprising nanocrystals and comprising a main component of $(Fe_{(1-(\alpha+\beta))}X1_{\alpha}X2_{\beta})_{(1-(a+b+c+d+e+f))}M_aB_bP_cSi_dC_eS_f$, where:

X1 is one or more of Co and Ni,

X2 is one or more of Al, Mn, Ag, Zn, Sn, As, Sb, Cu, Cr, Bi, N, O, and rare earth elements, M is Nb, a, b, c, d, e, f, a, and β are atomic ratios, and $0.070 \leq a \leq 0.160$, $0.020 \leq b \leq 0.200$, $0.030 \leq c \leq 0.050$,
$0 \leq d \leq 0.060$,
$0 \leq e \leq 0.030$,
$0.0010 \leq f \leq 0.030$,
$0.005 \leq f/b \leq 1.50$,
$0.735 \leq 1-(a+b+c+d+e+f) \leq 0.900$,
$\alpha \geq 0$,
$\beta \geq 0$, and
$0 \leq \alpha+\beta \leq 0.50$ are satisfied, wherein an average circularity of the soft magnetic alloy powder is 0.95 or more, the nanocrystals have a bcc phase, and a compound phase other than a bcc phase in the nanocrystals has a crystallinity of 2% or less.

2. The soft magnetic alloy powder according to claim 1, wherein the nanocrystals have a crystallinity of 25% or more.

3. The soft magnetic alloy powder according to claim 1, wherein $0.005 \leq f/b \leq 0.500$ is satisfied.

4. A dust core comprising the soft magnetic alloy powder according to claim 1.

5. A magnetic component comprising the soft magnetic alloy powder according to claim 1.

6. An electronic device comprising the soft magnetic alloy powder according to claim 1.

7. The soft magnetic alloy powder according to claim 1, wherein the soft magnetic alloy powder is produced by an atomization method including spraying a molten alloy using a nozzle having a diameter in a range of 0.5 to 3 mm.

* * * * *